Aug. 10, 1937.   C. H. OWENS   2,089,412
VINEGAR GENERATOR
Filed May 5, 1936   5 Sheets-Sheet 3
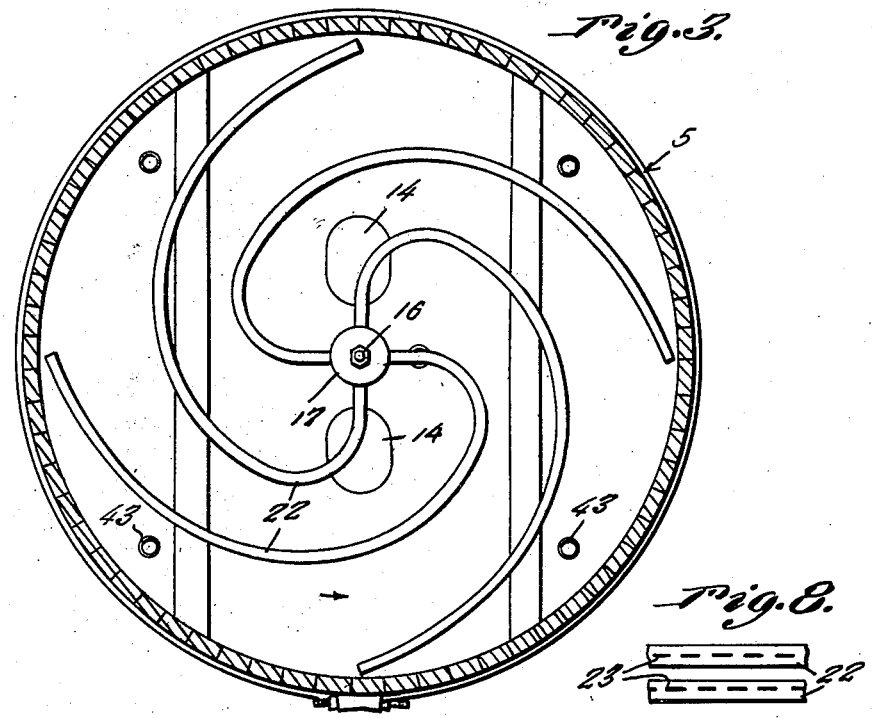
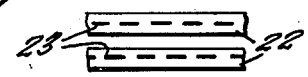
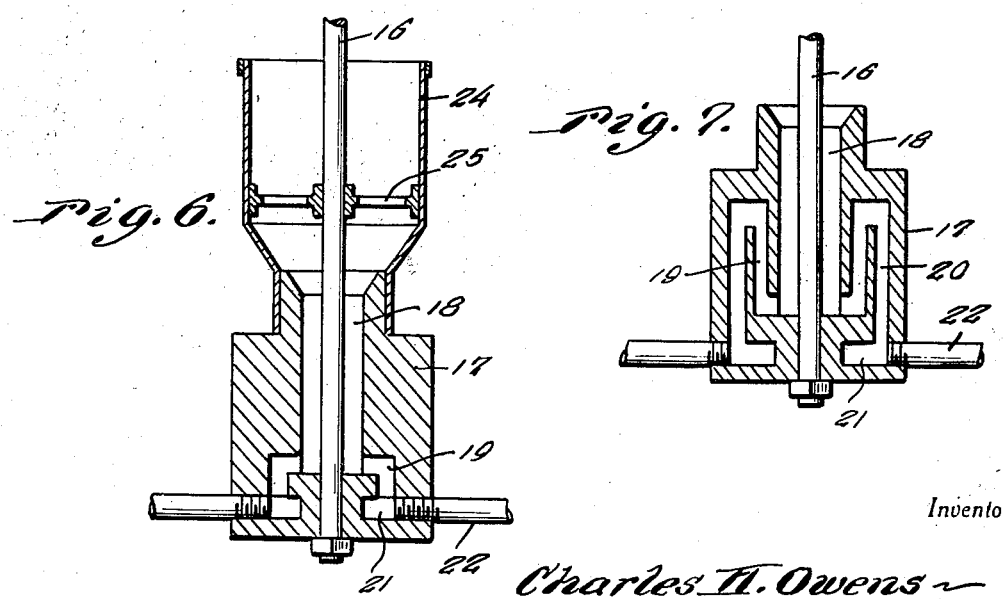
Inventor
Charles H. Owens
By Clarence A. O'Brien and
Hyman Berman
Attorneys Aug. 10, 1937.  C. H. OWENS  2,089,412
VINEGAR GENERATOR
Filed May 5, 1936  5 Sheets-Sheet 4

Inventor
Charles H. Owens
By Clarence A. O'Brien and
Hyman Berman
Attorneys

Aug. 10, 1937.  C. H. OWENS  2,089,412
VINEGAR GENERATOR
Filed May 5, 1936   5 Sheets-Sheet 5

Inventor
Charles H. Owens
By Clarence A. O'Brien and
Hyman Berman
Attorneys

Patented Aug. 10, 1937

2,089,412

UNITED STATES PATENT OFFICE 2,089,412

VINEGAR GENERATOR

Charles H. Owens, North Arlington, N. J.

Application May 5, 1936, Serial No. 78,055

5 Claims. (Cl. 99—245)

This invention relates to apparatus for generating vinegar and the object of the invention is to provide an apparatus of this character which will be positive and efficient in operation as well as one which can be cheaply and economically constructed and maintained.

The invention together with its objects and advantages will be best understood from a study of the following description taken in connection with the accompanying drawings wherein:

Figure 3 is a horizontal sectional view taken substantially on the line 3—3 of Figure 2.

Figure 6 is a sectional view through a rotary distributor.

Figure 7 is a fragmentary detail sectional view through the rotary distributor with the funnel removed, and taken at substantially right angles to Figure 6.

Figure 8 is a fragmentary plan view of two of the spray nozzles showing the manner in which the outlets of the nozzles are arranged in staggered relation.

Figure 1:
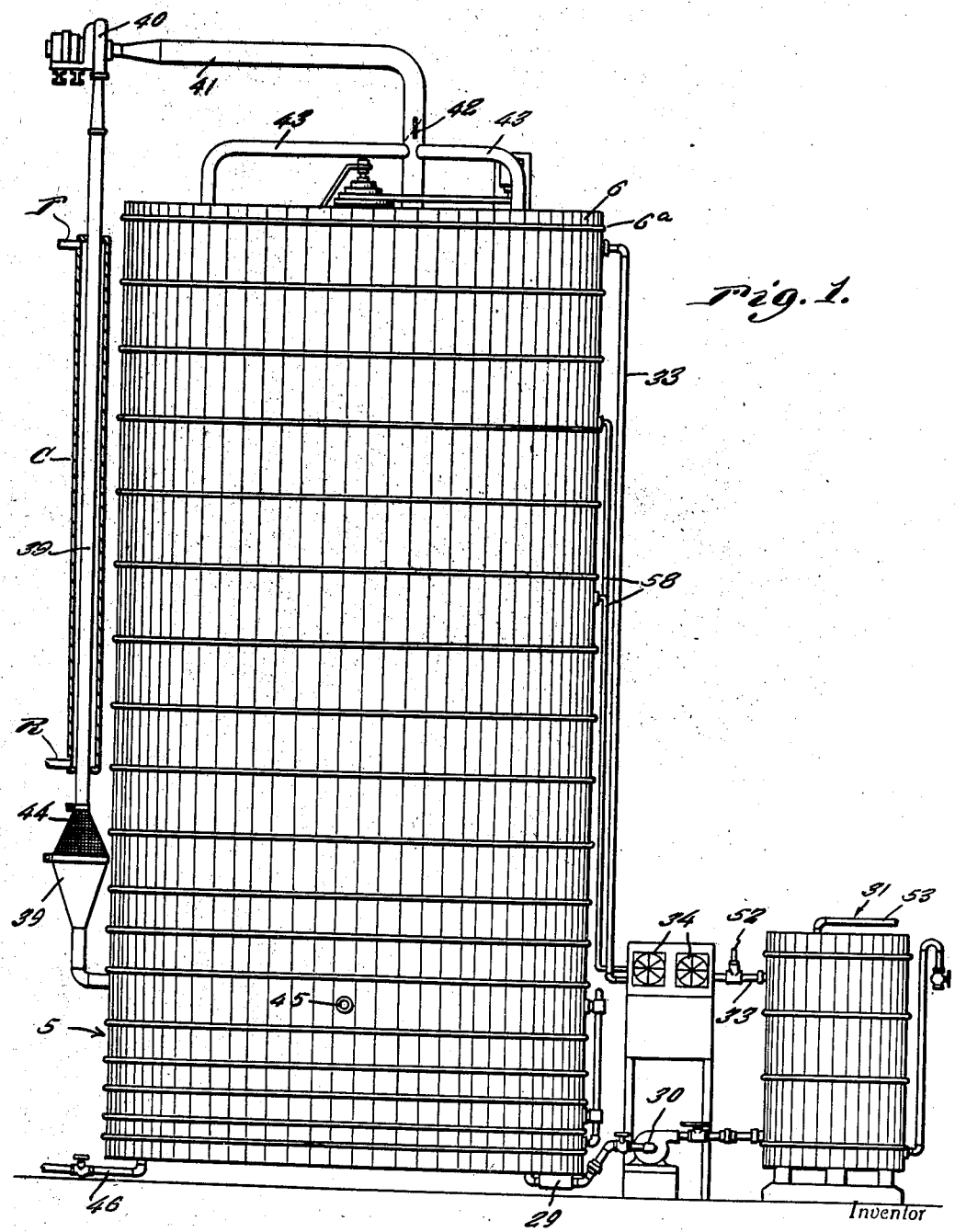
Figure 1 is an elevational view of the apparatus.

Referring to the drawings by reference numerals it will be seen that the apparatus comprises a main generator tank 5 which as shown is in the form of a drum the peripheral wall of which is formed from staves 6 and held in assembled relation through the medium of hoops 6a.

The bottom of the tank 5 is indicated by the reference numeral 8 and the top of the tank by the reference numeral 9.

Figure 12:
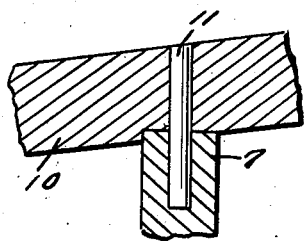
Figure 12 is a fragmentary detail sectional view showing the manner of connecting the planks of the false bottom with the supporting uprights for said planks.

Rising from the bottom 8 of the tank are concentric series of posts or standards 7 graduating in length, with the longer posts being in the inner series and the shorter posts being in the outer series. The posts 7 support radially disposed support timbers 10 which in turn support concentric series of planks 10a slightly spaced apart and serving to provide a false bottom that slopes from its center in all directions toward the peripheral wall of the tank. The stringers or supporting timbers 10 are secured to the posts 7 through the medium of dowel pins 11 as suggested in Figure 12 and in this connection it will be understood that the planks forming the false bottom 10a are similarly secured to the stringers or supporting timbers 10.

Above the false bottom 10a the tank 6 is adapted to contain to a suitable level hard coke or the like.

Also rising from the false bottom 10a are perforated air tubes 13 and as shown there is preferably a center air tube about which is disposed a circular series of such air tubes. The air tubes 13 are preferably formed of wood being closed at the top thereof and opened at the bottom as suggested in the drawings. It will thus be seen that air from the bottom of the tank 5 will pass upwardly through the tubes for aerating the coke supported on the false bottom 10a.

The coke or the like is introduced into the upper part of the tank 5 through manholes 14 suitably provided in top 9. (See Figure 3.)

Suitably journalled as at 15 in the top 9 is a shaft 16 on the inner end of which is a rotating distributor which as best shown in Figures 6 and 7 comprises a body member 17 having a main inlet passage 18 and passages 19 and 20 respectively leading from the main passage 18 to a distributor chamber 21 from which extends spray pipes 22 arranged preferably as shown in Figure 3.

Spray pipes 22 as shown in Figure 8 are provided with discharge slots 23, with the slots of one pipe arranged in staggered relation with respect to the slots in the other spray pipe.

The distributor member 17 has a reduced upper end or neck on which is sleeved the lower end of a funnel 24 provided internally with a spider 25 through the hub of which shaft 16 extends.

For driving the shaft 16 there is suitably mounted on the top 9 an electric motor 26 the armature shaft of which is connected with the shaft 16 by a variable speed belt and pulley drive connection 27 of any suitable type.

Figure 2:
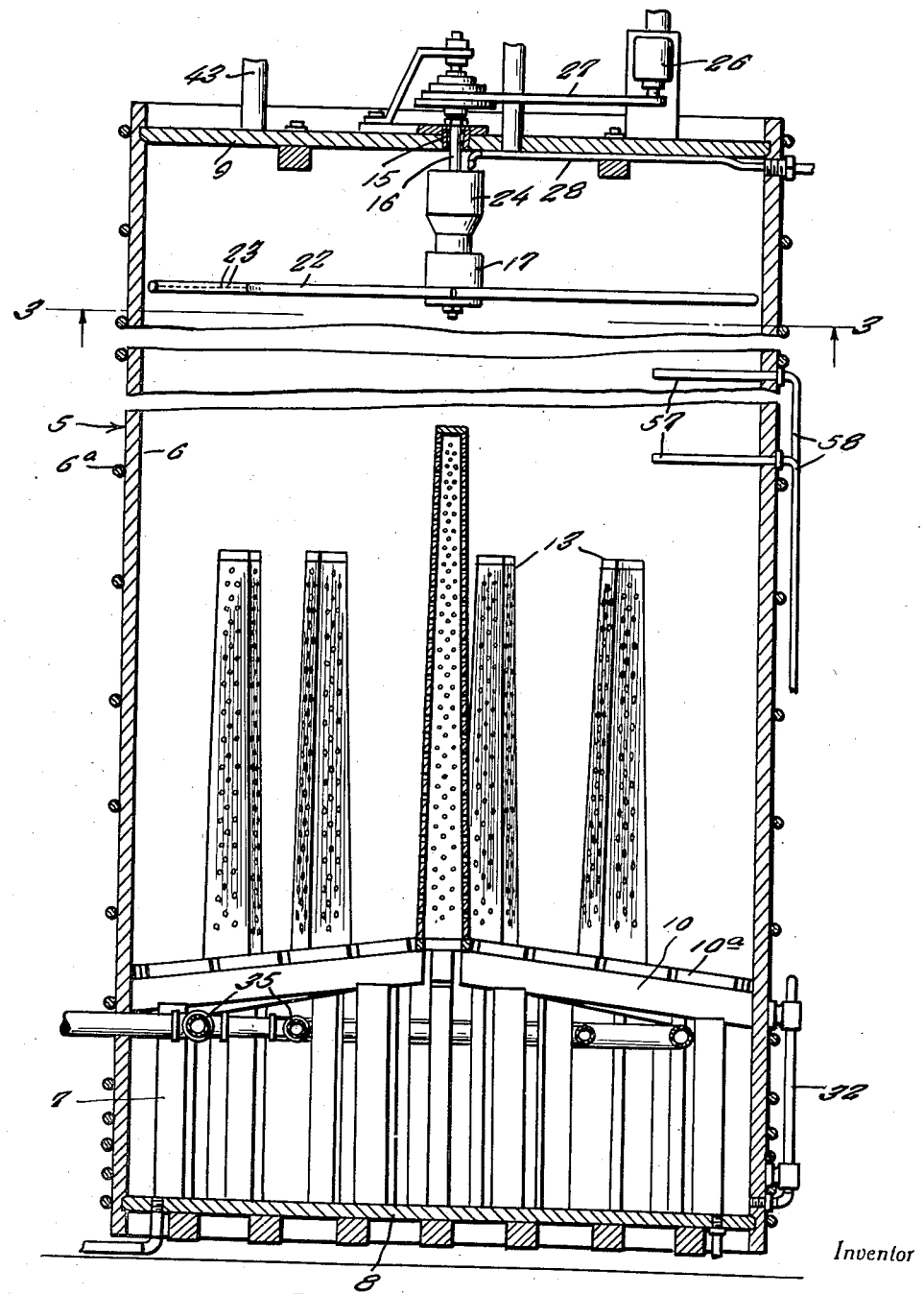
Figure 2 is a longitudinal sectional view through the generator tank.
Figure 4:
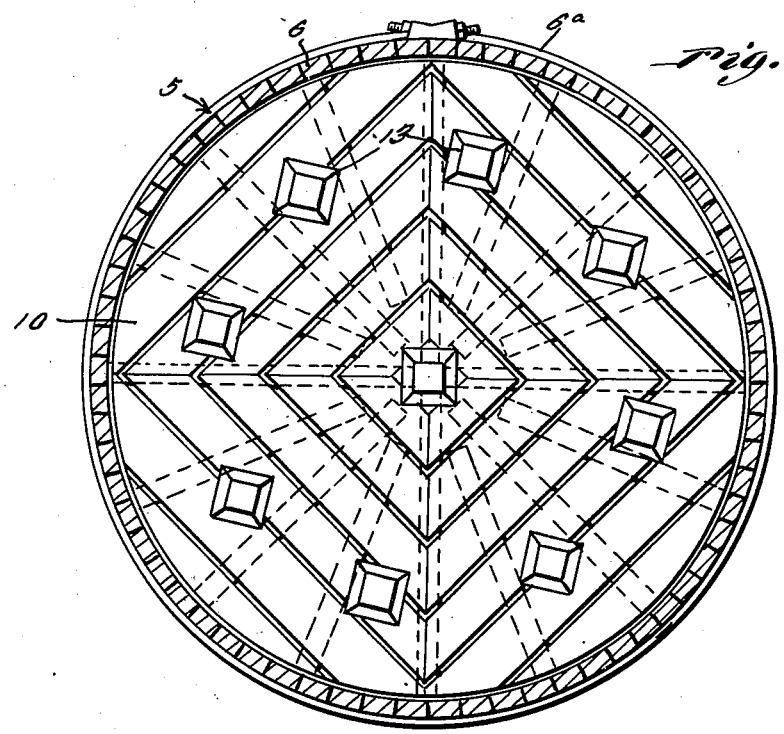
Figure 4 is a horizontal sectional view through the main tank and looking downwardly.

Liquid is supplied to the rotary spray device through the medium of a nozzle on one end of a pipe 28 that extends inwardly through the peripheral wall 6 of the tank or drum 5 with the nozzle disposed so as to discharge into the funnel 24 as shown in Figure 2. Thus it will be seen that the liquid will flow through the passages 18, 19, 20 to chamber 21 and from this chamber through the spray pipes 22 as the distributor is rotated, the liquid then seeping through the coke in the drum to seek a level in the bottom of the drum.

The liquid in the bottom of the drum is drawn off through piping 29 in which piping is arranged a pump 30 which serves to draw the vinegar from the drum and force it through the piping 29 into a cooler indicated generally by the reference numeral 31 and hereinafter more fully referred to.

For determining the level of the liquid in the bottom of the drum 8 there is provided a liquid level sight gauge 32 as clearly shown in Figure 2.

From the cooler 31 the liquid passes back to the generator drum 6 through piping 33 which connects the aforementioned nozzle equipped pipe 28 whereby the process of generation is repeated.

Figure 5:
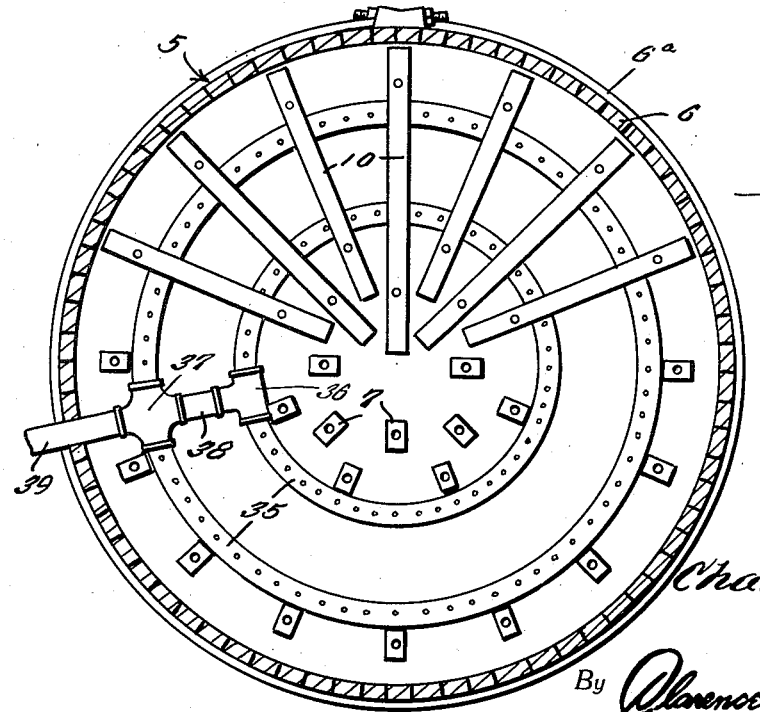
Figure 5 is a horizontal sectional view through the main tank beneath the false bottom and looking downwardly, with certain parts removed.

Further in accordance with the present invention there is disposed in the bottom of the drum or tank 5 below the false bottom 10a concentric circular air nozzles 35 which, as clearly shown in Figure 5 are connected together through the medium of cross 37, pipe 38, and T 36. Also the cross 37 is connected with one end of a pipe 39 that extends up alongside of the drum 5 as shown in Figure 1 and is connected with an air circulating fan of the electric motor driven type 40. The intake side of this fan is also connected with one end of a pipe 41 which at one end extends down into the drum 5 through the top thereof and is provided with a damper valve 42. At said end pipe 41 has branches 43 leading therefrom and these branches have downturned ends that extend into the drum 5 through the top thereof. Thus it will be seen that fan 40 will serve to draw the air up through the drum 5, piping 43 and 41 and force the air downwardly through the piping 39 to the coils or spray pipes 35. Obviously the air entering the drum from the spray pipes 35 will be drawn upwardly through the coke for aerating the same.

In this connection it will be further noted that arranged in the pipe 39 is a screened air intake 44.

For loading the drum 6 below the false bottom 10a said drum is provided with a suitable loading connection 45 while for draining or unloading the drum there extends from the bottom thereof a valve controlled drain pipe 46 (see Figure 1). It will also be seen that there will be a forced circulation of air through the coke which will aid greatly in the generating of the vinegar.

Figure 9:
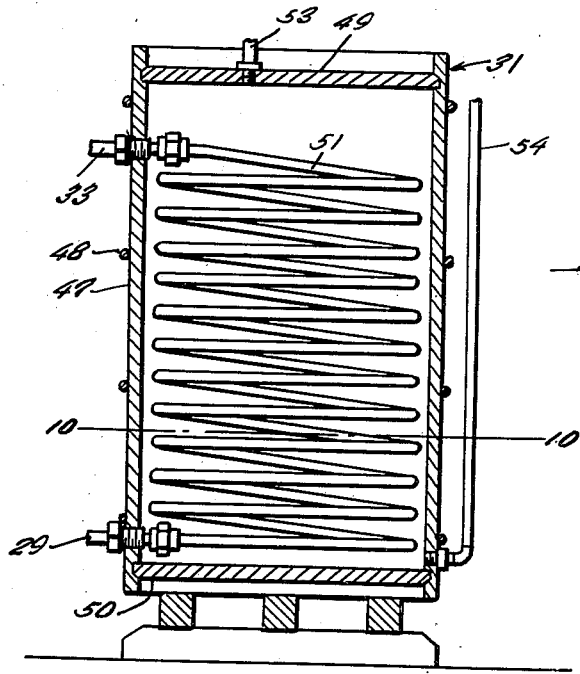
Figure 9 is a vertical sectional view through the cooler.
Figure 10:
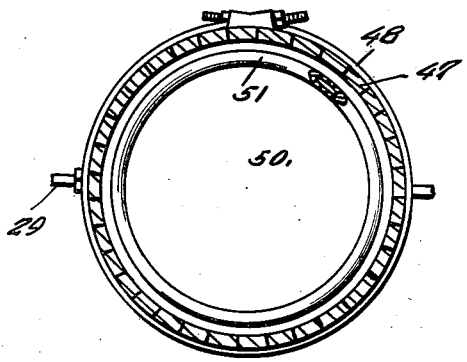
Figure 10 is a horizontal sectional view taken substantially on the line 10—10 of Figure 9.

Referring now to Figure 9 it will be seen that in the preferred embodiment thereof the cooler 31 comprises a drum 47 preferably made of staves held in place by hoops 48 and also having a top 49 and a bottom 50. Arranged within the drum 47 of the cooler is a coil 51 to the inlet end of which is connected the piping 29 and to the outlet end of which is connected the piping 33 which latter is also equipped as shown in Figure 1 with a suitable thermometer 52.

The tank or drum 47 is adapted to contain to a suitable level a liquid cooling medium, for example water and to this end a feed pipe from a suitable source of supply has an end 53 tapped into the top 49 of the tank while a discharge conduit for the cooling medium is indicated by the reference numeral 54 and has one end tapped into the peripheral wall of the tank 47 adjacent the bottom thereof as shown in Figures 1 and 9.

Figure 11:
Figure 11 is a fragmentary detail sectional view showing a slightly modified form of cooler coil.

If desired instead of having a flow of cooling medium through the tank 47 and a single coil 51 there may be substituted therefor as shown in Figure 11 a double coil consisting of an outer tube 55 connected at one end with a source of water supply or the like and at a relatively opposite end with a return conduit for the water or other cooling medium, and an inner tube 56 through which the vinegar will flow and which will be connected at one end with the aforementioned pipe 29, and at a relatively opposite end with the aforementioned pipe 33 as is thought to be clearly understood.

Also in accordance with the present invention there extends into the main generator tank 5 vertically spaced thermometer wells 57 as shown in Figure 2 and these wells are connected by piping 58 with the recording thermometers 34 as will be clear from a study of Figures 1 and 2.

It will be further noted that in operation the gases generated within the tank 5 will be drawn upwardly through the pipe 41 and its branches 43 by the pump 40 and forced downwardly through the pipe 39 thereby providing a closed system for the return of exhaust gases to the generator. For the purpose of condensing the gases and returning the gases in liquid form to the storage space at the bottom of the tank there is provided about the pipe 39 a casing C forming a water jacket around the conduit pipe to provide more positive cooling action. This casing or water jacket is connected with a suitable source of water supply through the medium of a feed pipe F and a return pipe R tapped into the casing or jacket C at the top and bottom thereof respectively and as shown in Figure 1.

Having thus described the invention, what is claimed as new is:

1. In a vinegar generator a main tank closed at its top and bottom, a false bottom supported in the main tank and adapted to support coke, a plurality of perforated air tubes arranged in circular formation extending upwardly from said false bottom and extending through the coke for aerating the same, means connected with said main tank beneath said false bottom for maintaining a forced circulation of air through said tubes, and means connected with said main tank for maintaining a forced circulation of the vinegar fluid through said main tank.

2. In a vinegar generator a main tank closed at its top and bottom, a false bottom supported in the main tank and adapted to support coke, said false bottom comprising a concaved floor and posts supporting said floor to provide a chamber beneath the floor, a plurality of perforated air tubes arranged in circular formation extending upwardly from said false bottom, and extending through the coke for aerating the same means through the coke for aerating the same, means bottom for maintaining a forced circulation of air through said tubes, a spray device rotatably mounted in the upper portion of said main tank and including a distributor chamber having a plurality of perforated nozzles projecting therefrom and a pipe for the vinegar fluid extending into said main tank and having a nozzle equipped end disposed to discharge into said spray device, driving means connected with said spray device for rotating the latter, concentric circular perforated air nozzles arranged in the chamber below said false bottom, an air circulating fan, a conduit pipe leading from one side of said fan and connected at one end with said perforated air nozzles, and a screened air intake in said conduit pipe externally of the main tank.

3. In a vinegar generator a main tank closed at its top and bottom, a false bottom supported in the main tank and adapted to support coke, said false bottom comprising a concaved floor and posts supporting said floor to provide a chamber beneath the floor, a plurality of perforated air tubes arranged in circular formation extending upwardly from said false bottom, and extending through the coke for aerating the same, means connected with said main tank beneath said false bottom for maintaining a forced circulation of air through said tubes, a spray device rotatably mounted in the upper portion of said main tank and including a distributor chamber having a plurality of perforated nozzles projecting therefrom and a pipe for the vinegar fluid extending into said main tank and having a nozzle equipped end disposed to discharge into said spray device, driving means connected with said spray device for rotating the latter, concentric circular perforated air nozzles arranged in the chamber below said false bottom, an air circulating fan, a conduit pipe leading from one side of said fan and connected at one end with said perforated air nozzles, a screened air intake in said conduit pipe externally of the main tank, a pipe extending from the inlet side of said circulating fan, branches leading from the last named pipe, said last named pipe and said branches having ends opening into the main tank through the top of said main tank.

4. In a vinegar generator a main tank closed at its top and bottom, a false bottom supported in the main tank and adapted to support coke, said false bottom comprising a concaved floor and posts supporting said floor to provide a chamber beneath the floor, a plurality of perforated air tubes arranged in circular formation extending upwardly from said false bottom, and extending through the coke for aerating the same, means connected with said main tank beneath said false bottom for maintaining a forced circulation of air through said tubes, a spray device rotatably mounted in the upper portion of said main tank and including a distributor chamber having a plurality of perforated nozzles projecting therefrom and a pipe for the vinegar fluid extending into said main tank and having a nozzle equipped end disposed to discharge into said spray device, driving means connected with said spray device for rotating the latter, concentric circular perforated air nozzles arranged in the chamber below said false bottom, an air circulating fan, a conduit pipe leading from one side of said fan and connected at one end with said perforated air nozzles, a screened air intake in said conduit pipe externally of the main tank, a pipe extending from the inlet side of said circulating fan, branches leading from the last named pipe, said last named pipe and said branches having ends opening into the main tank through the top of said main tank, a cooling device, a conduit pipe leading from the bottom of said main tank to said cooler, and a pipe leading from said cooler to the aforementioned nozzle equipped pipe whereby to provide for a closed circulation of fluid from the main tank to the cooler and back to the main tank.

5. In a vinegar generator a main tank closed at its top and bottom, a false bottom supported in the main tank and adapted to support coke, said false bottom comprising a concaved floor and posts supporting said floor to provide a chamber beneath the floor, a plurality of perforated air tubes arranged in circular formation extending upwardly from said false bottom, and extending through the coke for aerating the same, means connected with said main tank beneath said false bottom for maintaining a forced circulation of air through said tubes, a spray device rotatably mounted in the upper portion of said main tank and including a distributor chamber having a plurality of perforated nozzles projecting therefrom and a pipe for the vinegar fluid extending into said main tank and having a nozzle equipped end disposed to discharge into said spray device, driving means connected with said spray device for rotating the latter, concentric circular perforated air nozzles arranged in the chamber below said false bottom, an air circulating fan, a conduit pipe leading from one side of said fan and connected at one end with said perforated air nozzles, a screened air intake in said conduit pipe externally of the main tank, a pipe extending from the inlet side of said circulating fan, branches leading from the last named pipe, said last named pipe and said branches having ends opening into the main tank through the top of said main tank, a cooling device, a conduit pipe leading from the bottom of said main tank to said cooler, a pipe leading from said cooler to the aforementioned nozzle equipped pipe whereby to provide for a closed circulation of fluid from the main tank to the cooler and back to the main tank, and pump means arranged in the pipe connection between the bottom of said main tank and said cooler for maintaining the forced circulation aforementioned.

CHARLES H. OWENS.